(12) United States Patent
Faust et al.

(10) Patent No.: US 6,903,300 B2
(45) Date of Patent: Jun. 7, 2005

(54) METHOD FOR THERMALLY WORKING A WORKPIECE, THERMAL WORKING MACHINE THEREFOR, AND CUTTING OR WELDING TOOL SUITED FOR USE IN THE WORKING MACHINE

(75) Inventors: Josef Faust, Erbach (DE); Burkhard Fenner, Gross-Umstadt (DE); Hans-Joachim Albert, Hofheim (DE)

(73) Assignee: Messer Cutting & Welding GmbH (DE)

( * ) Notice: Subject to any disclaimer, the term of this patent is extended or adjusted under 35 U.S.C. 154(b) by 0 days.

(21) Appl. No.: 10/776,316

(22) Filed: Feb. 11, 2004

(65) Prior Publication Data

US 2005/0011866 A1 Jan. 20, 2005

(30) Foreign Application Priority Data

Jul. 16, 2003 (DE) ........................................ 103 32 422

(51) Int. Cl.[7] ............................................. B23K 10/00
(52) U.S. Cl. .............................. 219/121.54; 219/121.56
(58) Field of Search ...................... 219/121.54, 121.56, 219/124.1, 124.34, 124.02, 124.03, 124.22; 228/8, 12; 266/76; 148/222; 324/207.15, 207.16, 207.17, 207.26

(56) References Cited

U.S. PATENT DOCUMENTS

| | | | | |
|---|---|---|---|---|
| 2,747,152 A | * | 5/1956 | Greene | 219/124.24 |
| 2,971,079 A | * | 2/1961 | Sommeria | 219/124.34 |
| 3,024,354 A | * | 3/1962 | Mierendorf et al. | 219/124.03 |
| 3,484,667 A | * | 12/1969 | Wofsey | 219/124.34 |
| 3,588,660 A | * | 6/1971 | Purkhiser | 219/124.1 |
| 4,333,052 A | * | 6/1982 | Schmall | 219/124.34 |
| 4,810,966 A | * | 3/1989 | Schmall | 219/124.02 |
| 2003/0062891 A1 | | 4/2003 | Slates | |
| 2003/0085700 A1 | | 5/2003 | Momose | |

FOREIGN PATENT DOCUMENTS

| | | |
|---|---|---|
| DE | 3723844 | 1/1989 |
| DE | 4132651 | 10/1992 |
| DE | 19806290 C2 | 2/1998 |
| DE | 19919485 A1 | 4/1999 |

* cited by examiner

*Primary Examiner*—Teresa J. Walberg
(74) *Attorney, Agent, or Firm*—Andrus, Sceales, Starke & Sawall, LLP

(57) ABSTRACT

A thermal working tool (1) is movable along a workpiece surface (7) and includes a torch head (2) which has exchangeably mounted thereon cutting or welding tools (3; 4; 5) extending between the torch head (2) and the workpiece surface (7). A distance control for setting a predetermined working distance (A) between the working tool (1) and the workpiece surface (7) is carried out by a magnetic system, an alternating magnetic field being produced in a sensor body with ferromagnetic properties above the workpiece surface (7). The torch head (2) and at least one of the cutting or welding tools (3; 4; 5) contain ferromagnetic material and form at least part of the sensor body (2; 3; 4; 5). The magnetic field produced is sensed by two measuring coils, and is used for controlling the working distance (A).

9 Claims, 2 Drawing Sheets

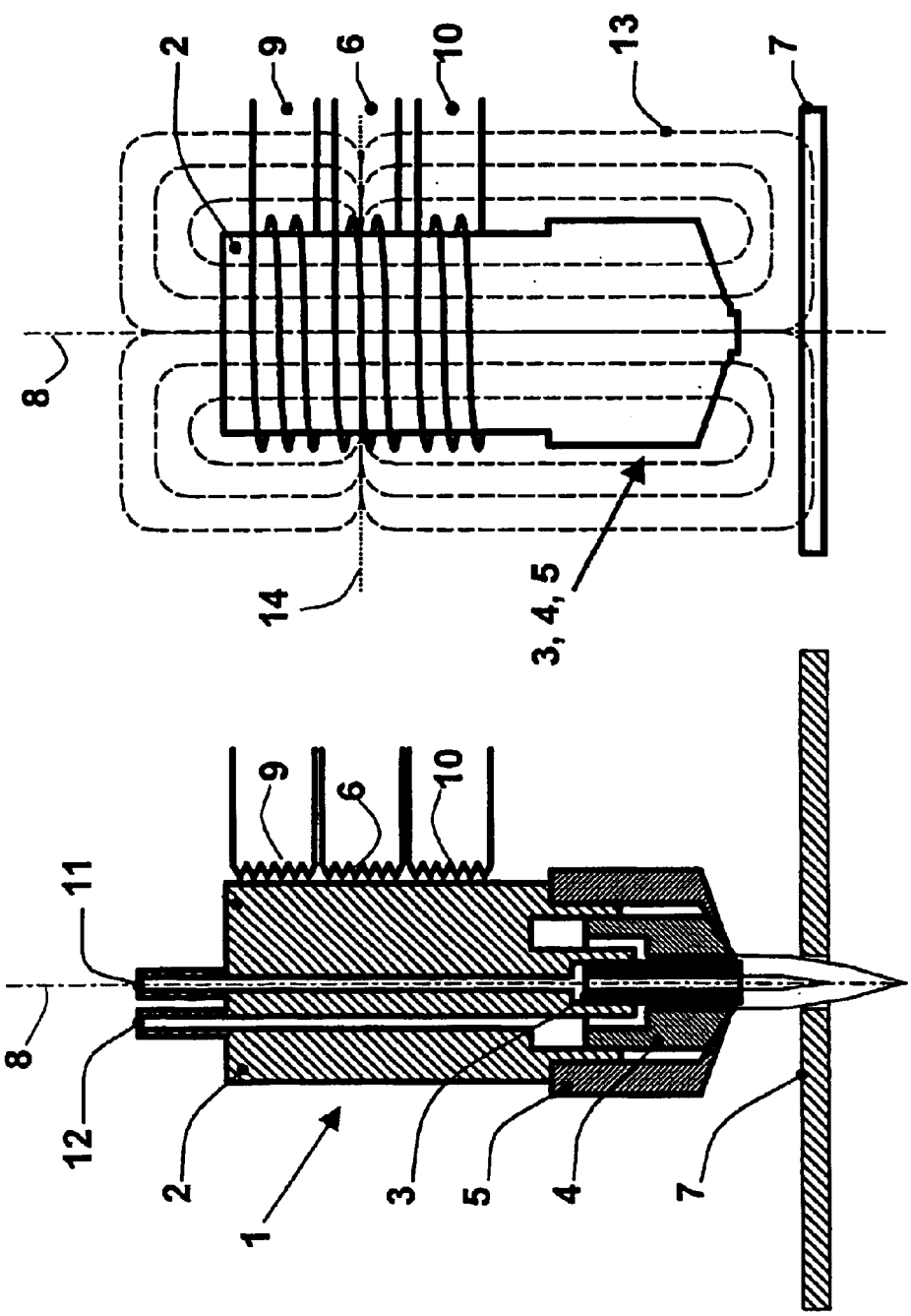

METHOD FOR THERMALLY WORKING A WORKPIECE, THERMAL WORKING MACHINE THEREFOR, AND CUTTING OR WELDING TOOL SUITED FOR USE IN THE WORKING MACHINE

CROSS REFERENCE TO RELATED APPLICATION

The present application claims priority from German Patent Application No. DE 103 32 422.4, filed Jul. 16, 2003.

FIELD OF THE INVENTION

The present invention refers to a method for thermally working a workpiece consisting of a ferromagnetic material by means of a thermal working tool which is moveable along a workpiece surface, wherein an alternating magnetic field is produced for controlling a working distance between the working tool and the workpiece surface, the magnetic field acting both in the area of the workpiece surface and in a sensor body with ferromagnetic properties above the workpiece surface, the magnetic field or changes thereof being sensed by means of a measuring device, and measurement signals of the measuring device being evaluated for controlling the working distance.

Furthermore, the present invention refers to a thermal working machine for working a workpiece consisting of a ferromagnetic material, the machine comprising a thermal working tool which is movable along a workpiece surface and comprises a torch head which has exchangeably mounted thereon cutting or welding tools extending between the torch head and the workpiece surface, and comprising a distance controller for setting a predetermined working distance between the working tool and the workpiece surface, the distance controller including an exciting element that is movable with the working tool for producing a magnetic field which is effective in a sensor body with ferromagnetic properties above the workpiece surface and in the area of the workpiece surface, a measuring device for sensing the magnetic field or changes thereof, and an evaluating unit by means of which measurement signals of the measuring device are evaluated for setting a control variable of the distance controller.

Moreover, the present invention refers to a cutting and welding tool for use in a thermal working machine of the invention, the tool being exchangeably mounted on a torch head.

BACKGROUND OF THE INVENTION

The thermal working of workpieces includes, particularly, the welding, cutting and surface treatment for producing marks. Depending on the task to be performed, different working machines, different types of working tools, such as autogenous torches, plasma torches, lasers, or markers, are used.

Online process monitoring gains more and more importance in the thermal treatment of materials for performing high-quality welding, cutting and marking work on workpieces. For such automating operations the working processes must be monitored to avoid process errors that would lead to failure or to an interruption in the process sequence. Moreover, attention must be paid to a high and, if possible, constant quality of a cut, marking or weld seam. In this connection a uniform working distance between the working tool and the workpiece plays an important role. Known are various distance measuring and controlling devices that work in an inductive, capacitive or manual way.

A method for the capacitive distance measurement is e.g. known from DE 41 32 651 C. The capacitive sensors are arranged in concentric or offset fashion relative to the working tool, for instance, in the form of measuring elements which are mounted on the tool and are arranged opposite the workpiece to be treated. The distance between the measuring element and the workpiece is equal to a specific capacitance which is measured electronically and used for distance control.

The capacitive measurement of the distance between workpiece and working tool has, however, the drawback that the capacitive measurement value is affected by parasitic capacitances, such as rust adhering to the workpiece, surface coatings, water, water vapor, or changing ambient conditions. The measurement value is also affected by the interfering contour of the sensor element mounted on the working tool, or its holder. These interfering effects are even intensified when the working tool and the components around the tool are soiled by material rebound during the treatment of the material.

Use is also made of working machines in which the working area is surrounded by a water jacket to prevent environmentally harmful substances from exiting. The resulting pool of conductive water also leads to a wrong measurement in the case of a capacitive distance measurement. An underwater detection of data with capacitive sensors is thus not possible.

It is further known that inductive sensors are used for distance measurement, with one or several induction coils being arranged around the torch, of which each as a frequency-determining element is connected within a resonant circuit, the latter effecting a change in frequency due to a change in inductivity of the coil as a consequence of a change in distance relative to the tool. The evaluation of such frequency changes is carried out by means of known circuits or band filters.

In inductive sensors, the same problems as the ones described above for capacitive sensors arise with respect to disturbances. Moreover, inductive sensors have the drawback that they are only suited for measuring short working distances because they cannot withstand high thermal loads and can thus not be arranged in the direct neighborhood of the working process.

A method and a thermal working machine as well as a working tool according to the above-mentioned type are known from DE 37 23 844 A1. The working distance between the cutting nozzle of a welding torch and the workpiece to be treated is controlled by means of a sensor in the form of a magnet system. The sensor comprises an annular body consisting of an iron material, which surrounds the torch head and comprises four downwardly extending magnetic yokes that are distributed in concentric and uniform fashion around the circumference of the cutting nozzle. Each of the four yokes carries a coil having an axis extending in parallel with the longitudinal axis of the torch. Two opposite coils are connected in series in the same sense and are used as exciting coils in that an alternating current of high frequency is flowing through the coils, whereby an alternating magnetic field is produced in the sensor body. The second pair of opposite coils is a pair of measuring coils in which an alternating current is induced by virtue of the alternating magnetic field.

On the precondition that the magnetic alternating field which is composed of the magnetic yokes is attenuated by the workpiece, the currents induced in the measuring coils are influenced by the topography and distance of the workpiece positioned underneath the sensor. Apart from the distance between the cutting nozzle and the workpiece, this attenuation depends on the material characteristics of the workpiece, such as magnetic permeability and the electrical conductivity of the workpiece.

The distance of the cutting nozzle of the welding torch from the workpiece surface is thus a function of the voltage induced in the measuring coils, so that it can be converted in a downstream electronic system with the help of a characteristic line, which has been drawn up before for the respective process, into a voltage which is proportional to the distance and which is used as a control variable for distance control. In the control device, the respective characteristic lines and the typical set values for the working distances can be stored for different topographies and materials.

In the known device, the magnetic yoke and thus the exciting and measuring coils must be positioned near the workpiece to be treated. At said place they are exposed to a high thermal load. The intended function of the apparatus may thus be affected by the high temperature or also by material rebound from the workpiece treated.

The separate magnetic yoke which surrounds the cutting torch proper produces a large measuring patch, which is tantamount to a low measuring accuracy. It has therefore been found that the evaluation of the distance measurement in the known method is prone to a great measuring error.

Upon changes in the process parameters, e.g. the material to be treated, its topography, or upon change of the treatment tool, a new characteristic line which must be prepared under great efforts is needed for controlling the working distance.

SUMMARY OF THE INVENTION

It is therefore the object of the present invention to provide a method for thermally treating a workpiece, wherein the working distance between the working tool and the workpiece can be set and controlled easily and with high accuracy at the same time, and which is largely insensitive to external disturbance.

Furthermore, it is the object of the present invention to provide a working machine suited for carrying out the method, which permits a local measurement of the working distances and is also suited for measuring large distances.

Moreover, it is the object of the present invention to provide a working tool suited for use in the working machine of the invention.

As for the method, this object starting from the above-mentioned method is achieved according to the invention in that the torch head and at least one of the cutting or welding tools are used as a sensor body.

In the method of the invention, a magnetic system is used for setting the working distance between the workpiece surface and the thermal working tool, in which system the sensor body is formed by the torch head and by at least one of the cutting or welding tools fixed onto the torch head.

Therefore, the torch head and the at least one cutting or welding tool in question exhibit ferromagnetic properties. Said parts are made fully or partly from a ferromagnetic material. A coating of the parts, e.g. for protection against oxidation, does not affect the method according to the invention.

The cutting or welding tools, which are connected to the torch head on the whole, are normally a cutting nozzle, which is often surrounded by a heating nozzle, or an electrode (in the case of a plasma torch). Cutting and heating nozzles are often fixed to the torch head by means of a retaining ring gripping around the nozzles in the manner of a cap. One of said parts between torch head and workpiece surface (e.g. nozzle electrode, heating nozzle, retaining cap), several or all of said parts, have ferromagnetic properties and are hereinafter also designated as "sensor tip".

The loss in magnetic field strength is the smaller the larger the cross-section of ferromagnetic material is from the point of excitation up to the workpiece surface. The material with the ferromagnetic properties is normally iron or an iron-containing alloy. The torch head and the sensor tip consist of the same material or of different materials. It is essential that the material of the sensor body on the whole can be magnetically polarized in an electric alternating field and that the magnetic field strength can be measured in the area of the workpiece surface and is attenuated by the workpiece.

The magnetic polarization is transmitted by means of the sensor body from the place of its excitation towards the workpiece surface, which can be shown schematically by magnetic field lines which extend along a closed path, starting from the point of excitation over the torch head and the sensor tip, and which during their return movement interact with the workpiece such that the magnetic field is attenuated. A change in the distance between sensor tip and workpiece surface is therefore noticeable in a change in the properties of the magnetic field. This change in the properties of the magnetic field is used for distance control, as will be explained in more detail further below.

The sensor body is formed by the burner head and the sensor tip and the magnetic field produced is moved by the body up to the workpiece surface and is thus focused on the area of the cutting process. This facilitates a locally exact distance control. A separate sensor body to be arranged outside the torch head, as is suggested in the prior art, is not needed.

The magnetic field is excited at a distance from the workpiece surface, which ensures, on the one hand, that the exciting means is hardly impaired by the process temperature and, on the other hand, guarantees a magnetic field strength in the area of the workpiece surface that is sufficiently large for evaluation. The location of the magnetic field excitation is positioned in the area of the torch head or outside thereof. It is advantageous for the measuring accuracy that the torch head has a comparatively large mass in the standard working tools and that a large cross-section with ferromagnetic material can be provided via the torch head, so that the losses in the electric alternating field are small.

An improvement of the method according to the invention is achieved by the measure that the magnetic field is produced by means of an exciting coil through which the sensor body extends such that magnetic field lines run through the body above and below a cross-sectional plane through which a central coil plane of the exciting coil is extending, the magnetic field lines above the coil plane being sensed by means of an upper measuring element, and a first measuring signal being produced in this process that has a first amplitude and a first phase, and the magnetic field lines below the coil plane being sensed by a lower measuring element, whereby a second measuring signal is produced that has a second amplitude and a second phase, the relative position between first phase and second phase being determined and used as a phase shift for controlling the working distance.

An exciting coil is here used for producing the magnetic field, the coil surrounding the sensor body such that a rotationally symmetrical magnetic field that is coaxial to the longitudinal axis of the sensor body can be produced in said body. Due to the rotational symmetry of the magnetic field, preferred directions or shadings are avoided, so that the distance measurement is the same in all lateral directions, which enhances the measuring accuracy.

The exciting coil is arranged relative to the sensor body such that the body extends above and below the exciting coil. In particular, it extends above and below a cross-sectional plane through which the central coil plane of the exciting coil is running. The central coil plane is positioned at half the height of the exciting coil. The magnetic field produced in this way has a portion above the central coil plane and a portion below said plane. Said portions of the magnetic field are sensed separately by means of an upper measuring element and by means of a lower measuring element.

Hence, at least two measuring elements are provided, each producing a measuring signal in the form of an electric alternating field having an amplitude depending on the magnetic field strength in the area concerned, and each having a specific phase position for zero crossing.

According to the invention, it is not the amplitude that is evaluated for controlling the working distance, but the relative position between the phases of the first and second measurement signals. It has here been found that a change in the working distance has an effect not only on the amplitude, but also on the phase position of the measurement signals. A change in the working distance causes a relative shift in the phase position of the first and second measurement signal. Said phase shift is used according to the invention for controlling the working distance, for it has further been found that the phase shift is less sensitive to disturbances in the area of the magnetic field than the amplitude of the measuring signal, so that the evaluation of the phase shift yields a larger measuring accuracy.

Moreover, in the method according to the invention a characteristic line need not be drawn up for the evaluation of the measurement signals relative to the working distance. It suffices for a distance control when the output value of the phase shift is detected in the set value of the working distance and when the distance is readjusted upon deviations from said value.

Preferably, the upper measuring element is designed as an upper measuring coil, and the lower measuring element as a lower measuring coil, the upper measuring coil and the lower measuring coil being interconnected such that the first and second amplitudes compensate one another at least in part.

The design of the measuring elements in the form of measuring coils yields a measurement signal that is substantially independent of the temperature. The measuring coils are here wired such that the amplitudes of the two measurement signals compensate one another at least in part. This facilitates the evaluation of the phase shift. A movement of electrically conductive parts within the measuring coils is not needed for producing an electrical signal.

A particularly advantageous result is obtained when an exciting coil extending coaxial around a central axis of the sensor body is used.

A rotationally symmetrical magnetic field is produced by using an exciting coil extending coaxial around the central axis of the sensor body, the magnetic field being focused onto the point of the cutting process and being thus without any preferred direction. In connection with an also rotationally symmetrical detection of the magnetic field by measuring coils which extend coaxial around the central axis of the sensor body, this yields a high measuring accuracy.

As for the thermal working tool, the above-mentioned object, starting from the generic working tool, is achieved according to the invention in that the torch head and at least one of the cutting or welding tools contain ferromagnetic material and form at least part of the sensor body.

For setting the working distance between workpiece surface and thermal working tool, a magnetic system is used according to the invention, in which system the sensor body is formed by the torch head and by at least one of the cutting or welding tools fixed to the torch head.

Therefore, the torch head and the at least one cutting or welding tool in question have ferromagnetic properties. These parts are made fully or in part from a ferromagnetic material. The coating of the parts, e.g. for protection against oxidation, does not essentially impair the result.

The cutting or welding tools that are connected to the torch head on the whole are normally a cutting nozzle surrounded by a heating nozzle. Cutting nozzle and heating nozzle are often fixed to the torch head by means of a holding ring which grips around the nozzles in the manner of a cap. In a plasma torch, the electrode forms an essential cutting or welding tool in the sense of the invention. One of the parts between torch head and workpiece surface, several or all of said parts have ferromagnetic properties and will also be called "sensor tip" in the following.

The loss in magnetic field strength is the smaller the larger the cross-section of ferromagnetic material is from the point of excitation up to the workpiece surface. The material with ferromagnetic properties is normally iron or an iron-containing alloy. The torch head and the sensor tip consist of the same material or of different materials. It is essential that the material of the sensor body on the whole can be polarized magnetically in an electric alternating field and that the magnetic field strength in the area of the workpiece surface can be measured and attenuated by the workpiece.

The magnetic polarization is transmitted by means of the sensor body from the place of its excitation towards the workpiece surface, which can be shown schematically by magnetic field lines which extend along a closed path, starting from the point of excitation over the torch head and the sensor tip, and during their return movement interact with the workpiece such that the magnetic field is attenuated. A change in the distance between sensor tip and workpiece surface can thus be noticed in a change in the properties of the magnetic field. Said change in the properties of the magnetic field is used for distance control, as explained above on the basis of the method of the invention.

The sensor body is formed by the torch head and the sensor tip and the magnetic field produced is moved by the sensor body up to workpiece surface and is thereby focused on the area of the cutting process. A locally accurate distance control is thereby facilitated. A separate sensor body to be arranged outside the torch head, as suggested in the prior art, is not needed.

The magnetic field is excited at a distance from the workpiece surface, which makes sure, on the one hand, that the exciting means is hardly affected by the process temperature and guarantees, on the other hand, a magnetic field strength in the area of the workpiece surface that is sufficiently large for evaluation. The location of the magnetic field excitation is within the area of the torch head or outside thereof. It is of advantage to measuring accuracy that the torch head has a relatively large mass in the standard working tools and that a large cross-section with ferromagnetic material can thus be provided via the torch head, so that the losses in the electric alternating field are low.

It has turned out to be advantageous when the exciting element is designed as an exciting coil through which the sensor body extends such that magnetic field lines extend therein above and below a cross-sectional area which surrounds the central coil plane of the exciting coil, an upper measuring element and a lower measuring element being provided, and the upper measuring element extending in the area above the central coil plane, and the lower measuring element in the area below the central coil plane.

The exciting element is designed according to the invention as an exciting coil which surrounds the sensor body. The sensor body is arranged inside the exciting coil such that a magnetic polarization is produced therein, with field lines above and below a cross-sectional area in which the central coil plane of the exciting coil is located. An upper measuring element and a lower measuring element that form part of the measuring device are positioned above and below said coil plane. The upper measuring element extends at least in part along the sensor body in the area above the central coil plane, and the lower measuring element extends at least in part along the area below the central coil plane. In the simplest case the upper measuring element is arranged above the exciting coil and the lower measuring element below said coil. When exciting coils and measuring elements are arranged in superposed fashion, this yields a small lateral construction, so that a particularly small working tool is made possible. As an alternative, the two measuring elements are e.g. arranged directly one above the other in front of or behind the exciting coil.

The measuring device permits an evaluation of measurement signals using the phase shift of the measuring signal as described in more detail above on the basis of the method according to the invention.

The measuring elements are e.g. arranged laterally from the sensor body. In a particularly preferred embodiment of the working tool of the invention, the measuring elements, however, are designed in the form of an upper measuring coil and a lower measuring coil, the upper measuring coil, the lower measuring coil and the exciting coil having a joint central axis along which the sensor body extends.

The configuration of the measuring devices in the form of measuring coils instead of other magnetic-field measuring devices, such as Hall sensors or magnetic field sensors, has the advantage that the measurement signal obtained is substantially temperature-independent.

The coaxial arrangement of the exciting coil and the measuring coils around a joint central axis in which the sensor body extends makes it possible to produce and evaluate a rotationally symmetrical magnetic field which is focused onto the point of the cutting process, and to detect the magnetic field by means of the measuring coils in symmetry therewith.

It has turned out to be particularly useful when the upper measuring coil and the lower measuring coil are designed such that they compensate the voltages produced in the measuring coils in the working position of the working tool.

The coils are designed with respect to the number of their windings and their size such that in the working position the amplitudes of the voltages produced in the measuring coils add up to about zero. This guarantees that upon changes in the working distance the measurement signals of the two measuring coils are changing approximately in proportion, so that an evaluation of the phase shift as described above with reference to the method of the invention is facilitated.

Advantageously, the torch head and the at least one cutting or welding tool consist entirely of ferromagnetic material.

As for the measuring accuracy, it is advantageous when a large cross-section of ferromagnetic material is provided by means of the torch head, so that losses in the magnetic field strength can be kept low. A torch head consisting of ferromagnetic material may be provided with a coating, e.g. for protecting the iron-containing material against oxidation. This applies equally to the at least one of the cutting or welding tools.

As for the cutting or welding tool, the above-mentioned object, starting from a cutting or welding tool of the above-mentioned type, is achieved according to the invention in that it consists of ferromagnetic material.

The cutting or welding tool consisting of ferromagnetic material helps to pass on the magnetic field lines from the place of excitation up to the workpiece surface, so that losses in the magnetic field strength can be kept low. A cutting or welding tool consisting of ferromagnetic material may be provided with a coating, e.g. for protecting the iron-containing material from oxidation.

The material with ferromagnetic properties is normally iron or an iron-containing alloy.

BRIEF DESCRIPTION OF THE DRAWINGS

The invention will now be described in more detail with reference to embodiments and a drawing. The drawing schematically shows in FIG. 1 an embodiment of the working tool of the invention in the form of an autogenous cutting torch;

FIG. 2 a schematic view of the extension of the magnetic field lines within and outside the cutting torch.

DETAILED DESCRIPTION OF THE PREFERRED EMBODIMENTS

Figure 3:
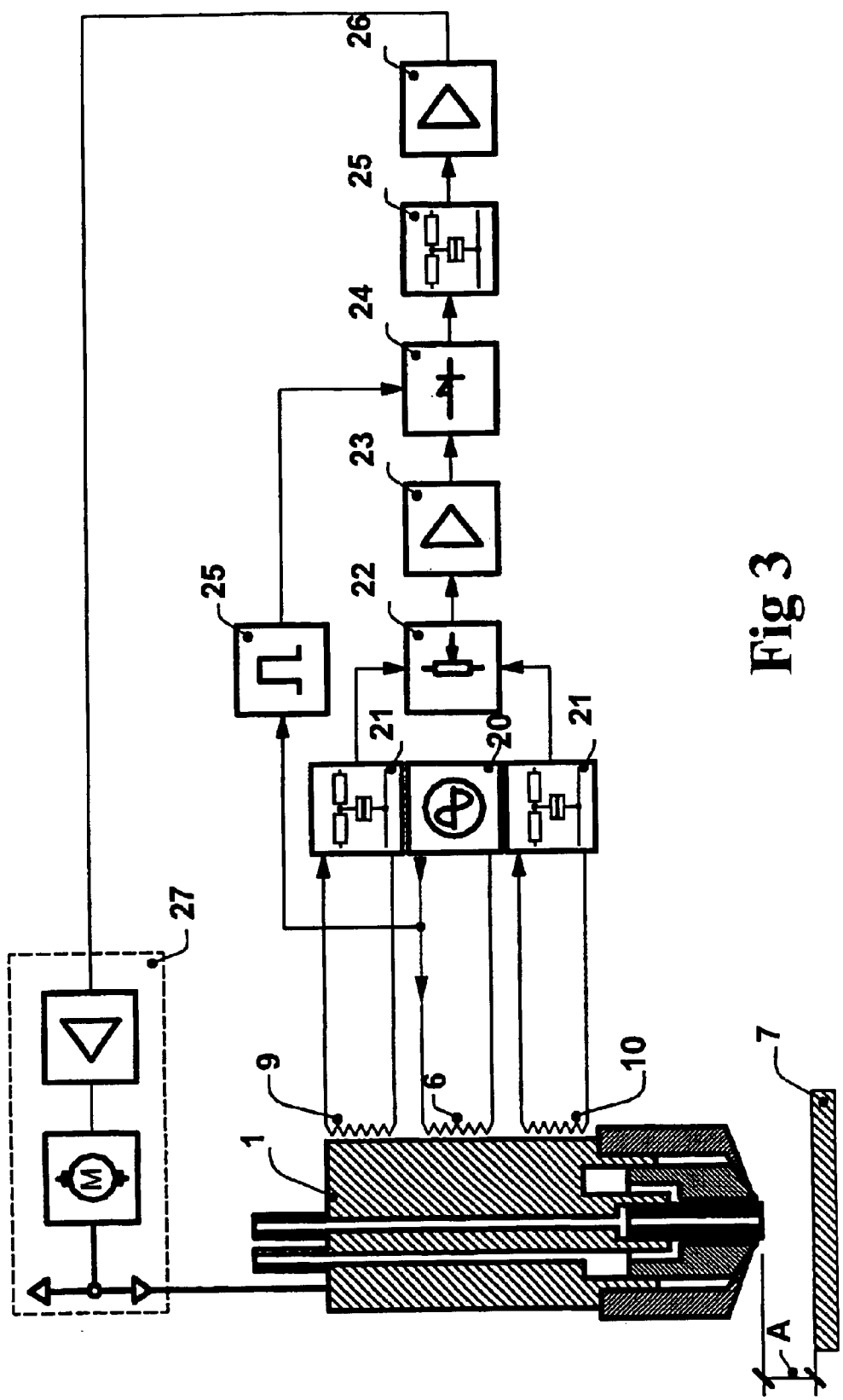
FIG. 3 the embodiment of the working tool of the invention according to FIG. 1, supplemented by a diagram for evaluating the measurement signals.

FIG. 1 shows an autogenous cutting torch which has reference numeral 1 assigned to it on the whole. The autogenous cutting torch 1 comprises a torch head 2 which has exchangeably mounted thereon, by means of a retaining cap 5, a cutting nozzle 3 and a heating nozzle 4 surrounding the cutting nozzle 3. It is essential for the present invention that the torch head 2 and at least one of the cutting or welding tools (3, 4, 5) have ferromagnetic properties. In the embodiment, both torch head 2 and cutting nozzle 3, as well as heating nozzle 4 and retaining cap 5 are made of a ferromagnetic iron-silicon alloy having 3 to 4% by wt. of silicon. All of these parts (2, 3, 4, and 5) are provided with a coating consisting of a dense corrosion-resistant material, such as chromium, titanium, chromium nitride (or a material with a similar action) for protection against oxidation.

The torch head 2 has a central axis 8 along which a line 11 extends for supplying cutting oxygen to the cutting nozzle 3. Furthermore, a line 12 is provided for supplying combustible gas.

Torch head 2, cutting nozzle 3, heating nozzle 4, and retaining cap 5 are in mechanical contact with one another and are magnetically polarized with an alternating polarity by means of an exciting coil 6 which is connected to an AC voltage generator 20. The AC voltage generator 20 may be designed as a separate component or may utilize the mains frequency. Due to magnetization, the magnetic field lines 13, as are schematically shown in FIG. 2, are formed. These run through the parts (2, 3, 4, 5) consisting of ferromagnetic material and through the workpiece 7, which is also made from a ferromagnetic material.

A further special feature of the thermal working tool of the invention is that the exciting coil 6 surrounds the torch head 2 in coaxial direction relative to the central axis 8 thereof, whereby a rotationally symmetrical magnetic field is created, as can be seen in the schematic illustration of FIG. 2.

An upper measuring coil 9 is provided above the exciting coil 6, and a lower measuring coil 10 below said exciting coil 6. They surround the torch head 2 also in coaxial direction relative to the central axis 8 thereof, thereby permitting a rotationally symmetrical detection of the magnetic field lines 13, as can be gathered from FIG. 2. Since the arrangement of the exciting coil 6 is asymmetrical relative to the height of the sensor body (parts 2, 3, 4, 5), there is also a corresponding initial asymmetry of the field line distribution. The two measuring coils 9; 10 are designed and electrically interconnected such that, despite said asymmetry, the amplitudes of their output signals approximately compensate one another at the predetermined working distance "A". The exciting coil 6 has a central coil plane 14 above which the field lines 13 are extending in part, the field strength thereof being sensed by the upper measuring coil 9, and below which the field lines 13 are extending in part, the field strength of these lines being sensed by the lower measuring coil 10.

The method of the invention for working a workpiece will now be described by way of example with reference to FIG. 3.

For identifying the components of the autogenous torch 1 of the invention, FIG. 3 uses the same reference numerals as FIG. 1. An electric alternating field of low frequency which in the ferromagnetic material of the torch head 2 effects a magnetic polarization in the case of which north pole and south pole alternate at the same frequency is produced by means of the AC generator 20 in the area of the exciting coil 6. The magnetic field lines 13 generated by the alternating magnetization run through the autogenous torch and the workpiece 7. As a result, an electrical signal with opposite amplitude and specific phase position of the zero crossing is produced in the two measuring coils 9, 10.

Upon changes in distance in the autogenous torch 1 relative to the workpiece 7, the field lines 13 will become shorter or longer. For the two measuring coils 9, 10, this effects not only a change in the amplitude of the respective signal, but also a shift in phase position. For the control of the working distance, it is not the amplitude of the signal of the measuring coils 9, 10 that is evaluated, but exclusively the phase shifts in the voltages generated in the measuring coils 9, 10.

FIG. 3 shows an embodiment of such an evaluation of the phase position by means of the measuring signals obtained with the apparatus of the invention for the purpose of controlling the working distance between workpiece surface and autogenous torch 1.

To this end the signals sensed by the upper measuring coil 9 and the lower measuring coil 10 are each fed to a frequency-selective filter 21, whereby signal noise is suppressed. The selected signals are supplied to a potentiometer 22. The output voltage at the potentiometer 22 is zero-set in a computer-assisted way in the embodiment. On account of the zero adjustment, the above-mentioned initial asymmetry of the field line distribution is compensated in consideration of the predetermined set working distance, unless this has already been carried out through the design of the measuring coils 9; 10. Thus, the amplitudes of the voltage signals from the measuring coils 9 and 10 are thereby mutually compensated on the basis of the set working distance, and the residual signal is set to the value zero. This measure facilitates the evaluation of the phase shift upon change in the working distance "A" between the autogenous cutting torch 1 and the surface of the workpiece 7.

The potentiometer signal is passed via an amplifier 23 into a phase discriminator 24 where it is compared with a synchronous reference signal tapped by the AC voltage generator 20 (symbolized by a comparator 25). Changes in the output signal of the AC voltage generator 20 in the course of a working process, e.g. due to a temperature drift, also have an effect on the reference signal and the output signals of the measuring coils 9, 10.

The phase discriminator 23 is a phase-dependent rectifier on the basis of which it can be detected whether an actual phase shift is above or below the preset "zero". The output signals of the phase discriminator 24 are integrated with the correct sign in the filter 25 and then supplied via a further amplifier 25 as a control variable for the distance control of a motor controller 27 for the stroke of the autogenous torch 1.

What is claimed is:

1. A method for thermally working a workpiece consisting of a ferromagnetic material by means of a thermal working tool (1) which is moveable along a work-piece surface (7), and comprises a torch head (2) which has exchangeably mounted thereon at least one cutting or welding tool, wherein an alternating magnetic field is produced for controlling a working distance (A) between said working tool (1) and said workpiece surface (7), said magnetic field acting both in the area of said workpiece surface (7) and in a sensor body with ferromagnetic properties above said workpiece surface (7), said magnetic field or changes thereof being sensed by means of a measuring device (9;10), and measurement signals of said measuring device (9;10) being evaluated for controlling said working distance (A), characterized in that said torch head (2) and at least one of the cutting or welding tools (3; 4; 5) are used as sensor body (2; 3; 4; 5).

2. The method according to claim 1, characterized in that said magnetic field is produced by means of an exciting coil (6) through which said sensor body (2; 3; 4; 5) extends such that magnetic field lines (13) are running through said body above and below a cross-sectional plane through which a central coil plane (14) of said exciting coil (6) extends, and that said magnetic field lines (13) above said coil plane (14) are sensed by means of an upper measuring element (9), a first measurement signal being produced that has a first amplitude and a first phase, and that said magnetic field lines (13) below said coil plane (14) are sensed by means of a lower measuring element (10), a second measurement signal being produced that has a second amplitude and a second phase, the relative position between first phase and second phase being determined, and a phase shift being used for controlling the working distance (A).

3. The method according to claim 2, characterized in that said upper measuring element is designed as an upper measuring coil (9) and said lower measuring element as a lower measuring coil (20), and that said upper measuring coil (9) and said lower measuring coil (10) are interconnected such that said first amplitude and said second amplitude mutually compensate one another at least in part.

4. The method according to claim 3, characterized in that an exciting coil (6) is used which coaxially extends around a central axis (8) of said sensor body (2; 3; 4; 5).

5. A thermal working machine for working a workpiece consisting of a ferromagnetic material, comprising a thermal working tool (1) which is movable along a workpiece surface (7) and comprises a torch head (2) which has exchangeably mounted thereon cutting or welding tools (3; 4; 5) extending between said torch head (2) and said workpiece surface (7), and comprising a distance controller for setting a predetermined working distance (A) between said working tool (1) and said workpiece surface (7), said distance controller including an exciting element (6) that is movable with said working tool (1) for producing a magnetic field which is effective in a sensor body with ferromagnetic properties above said workpiece surface (7) and in the area of said workpiece surface (7), a measuring device (9; 10) for sensing said magnetic field or changes thereof, and an evaluating unit (21–27) by means of which measurement signals of said measuring device are evaluated for setting a control variable of said distance controller, characterized in that said torch head (2) and at least one of said cutting or welding tools (3; 4; 5) contain ferromagnetic material and form at least part of said sensor body (2; 3; 4; 5).

6. The working machine according to claim 5, characterized in that said exciting element is designed as an exciting coil (6) through which said sensor body (2; 3; 4; 5) extends such that magnetic field lines (13) extend therein above and below a cross-sectional surface which includes the central coil plane (14) of said exciting coil (6), an upper measuring element (9) and a lower measuring element (10) being provided, and said upper measuring element (9) extending in the area above said central coil plane (14), and said lower measuring element (10) in the area below said central coil plane (14).

7. The working machine according to claim 6, characterized in that said measuring elements are designed in the form of an upper measuring coil (9) and a lower measuring coil (10), said upper measuring coil (9), said lower measuring coil (10) and said exciting coil (6) having a joint central axis (8) in which said sensor body (2; 3; 4; 5) extends.

8. The working machine according to claim 7, characterized in that said upper measuring coil (9) and said lower measuring coil (10) are designed such that the voltages produced in said measuring coils (9; 10) compensate one another in the working position of said working tool (1).

9. The working machine according to claim 5, characterized in that said torch head (2) and at least one of said cutting or welding tools (3; 4; 5) consist of ferromagnetic material.

* * * * *